United States Patent Office 3,014,023
Patented Dec. 19, 1961

3,014,023
POLYPEPTIDES
Robert Schwyzer, Riehen, and Bernhard Riniker, Birsfelden, Switzerland, assignors to Ciba Pharmaceutical Products Inc., Summit, N.J.
No Drawing. Filed May 6, 1959, Ser. No. 811,264
Claims priority, application Switzerland June 13, 1958
4 Claims. (Cl. 260—112)

This invention provides new polypeptides having the action of hypertensine.

The decapeptide, hypertensine I, which occurs in equine serum and has the amino-acid sequence L-asparaginic acid, L-arginine, L-valine, L-tyrosine, L-isoleucine, L-histidine, L-proline, L-phenylalanine, L-histidine, L-leucine and is known as Ileu⁵-hypertensine I, and the decapeptide called Val⁵-hypertensine I, which occurs in bovine serum and differs from the aforesaid decapeptide only in that its fifth amino acid is L-valine, are known. From equine serum there has also been isolated an octapeptide, Ileu⁵-hypertensine II, which differs from the corresponding hypertensine I in that it lacks the ninth and tenth amino-acids and is formed from the decapeptide by means of an enzyme present in the serum. In patent application No. 680,904, filed August 29, 1957, by Robert Schwyzer et al., is described a process for synthesising the octapeptide, Val⁵-hypertensine II, which corresponds to Val⁵-hypertensine I. It has also been found that the polypeptides corresponding to the aforesaid peptides, which polypeptides contain asparagine instead of asparaginic acid, possess the action of hypertensine and also that the second, third and fifth amino-acids can be replaced by related amino-acids without losing the hypertensine action. When other changes in the molecule have been made this action has been largely or wholly lost. Thus, the heptapeptide, which lacks the eighth amino-acid of the octapeptide, has no hypertensine action (see Lentz, Skeggs et al., Journ. Exp. Med., 104 (1956), 190).

The present invention provides heptapeptides having the formula L-α-(lower-aminoalkyl)-α-amino-acetyl-L-α-lower alkyl-α-amino-acetyl-L-tyrosyl-L-α-lower alkyl-α-amino-acetyl-L-histidyl-L-prolyl-L-phenylalanine in which the lower aminoalkyl group and the lower alkyl group contain 1–5 carbon atoms each.

It has been unexpectedly found that these heptapeptides possess a good hypertensine action, and especially L-arginyl-L-valyl-L-tyrosyl-L-valyl-L-histidyl-L-prolyl-L-phenylalanine of the formula

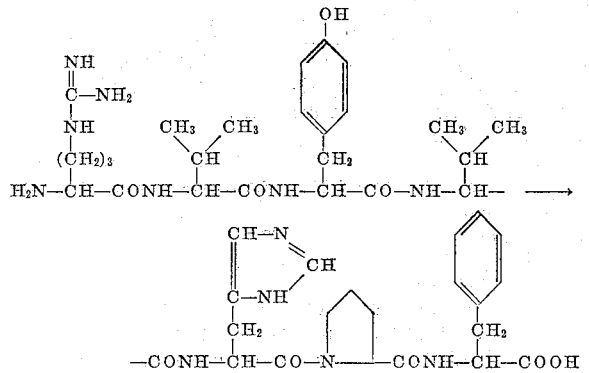

The aforesaid heptapeptides have the important advantage as compared with the known hypertensines in that they can be obtained very much more easily and cheaply.

As the residue of a L-α-(lower-aminoalkyl)-α-amino-acetic acid there may be mentioned, more especially, L-arginyl, l-ornithyl and L-lysyl, and as the residues of L-α-lower alkyl-α-amino-acetic acids there may be mentioned I-valyl and L-norvalyl, and also L-leucyl, L-isoleucyl and L-norleucyl, and L-alanyl, i.e. especially the radicals of natural amino-acids.

The new polypeptides are obtained by methods in themselves known for making peptides, the amino-acids being linked together in the aforesaid series singly or after being formed into small peptide units. Thus, one of the amino-acid molecules or peptide molecules in the form of an ester may be linked to a further amino acid molecule or peptide molecule, which contains a protected amino group, in the presence of a condensing agent such as a carbo-diimide or a phosphorus acid ester halide, or the amino-acid ester or peptide ester containing a free amino group may be reacted with an amino acid or peptide containing an activated carboxyl group (and protected amino group), for example, an acid halide, azide, anhydride or an activated ester, such as a cyanomethyl ester or carboxymethyl-thiol ester. Conversely, an amino-acid or peptide having a free carboxyl group (and a protected amino group) may be reacted with an amino-acid or peptide having an activated amino group (and a protected carboxyl group), for example, a phosphite-amide. All the said methods may be used for building up peptide linkages in the process of this invention, but the methods used in the example given below are especially advantageous. Free functional groups that do not take part in the reaction are advantageously protected, especially by means of a radical that can easily be split as by hydrolysis or reduction, amino groups, for example, by the tosyl or trityl radical and especially the carbobenzoxy group or colored protective groups, such as the para-phenylazo-benzyloxy-carbonyl group and the para-(para'-methoxy-phenylazo)-benzyloxy-carbonyl group. The hydroxyl group of tyrosyl need not be protected in the reaction.

The conversion of a protected amino group into a free amino group and also the conversion of a functionally converted carboxyl group into a free carboxyl group are carried out in the course of the process for making the heptapeptides and intermediate products by methods in themselves known by treatment with hydrolysing or reducing agents.

The heptapeptides of this invention are useful as agents for raising the blood pressure in the form of pharmaceutical preparations. These preparations contain the peptide in admixture with a pharmaceutical organic or inorganic carrier suitable for enteral, or parenteral administration. For making the carriers there are used substances that do not react with the polypeptides, for example, gelatine, lactose, glucose, sodium chloride, starch, magnesium stearate, talc, vegetable oils, benzyl alcohols, gums, polyalkylene glycols, white petroleum jelly, cholesterol or other known carrier for medicaments. The pharmaceutical preparations may be, for example, in the form of tablets, dragees, powders, salves, creams or suppositories or in liquid form as solutions, suspensions or emulsions. If desired, they may be steri'ized and/or may contain auxiliary substances, such as preserving, stabilizing, wetting or emulsifying agents. They may also contain other therapeutically valuable substances.

Depending on the procedure used the new compounds are obtained in the form of bases or salts thereof. From the salts the bases can be obtained by methods in themselves known. From the bases salts can be made by reaction with acids which are suitable for the formation of therapeutically useful salts, for example, in organic acids, such as hydrohalic acids, for example, hydrochloric acid or hydrobromic acid, or nitric acid, thiocyanic acid, sulfuric acid, phosphoric acid, or an organic acid, such as acetic acid, propionic acid, glycollic acid, lactic acid, pyroracemic acid, oxalic acid, malonic acid, succinic acid, maleic acid, fumaric acid, tartaric acid, citric acid, benzoic acid, cinnamic acid, salicylic acid, 2-phenoxy- or 2-acetoxy-benzoic acid, mandelic acid, methane sulfonic acid, ethane sulfonic acid, hydroxyethane sulfonic acid, benzene sulfonic acid or toluene sulfonic acid.

The following examples illustrate the invention:

EXAMPLE 1

*N-carbobenzyloxy-L-arginyl-L-valyl-L-tyrosyl-L-valyl-L-histidyl-L-prolyl-L-phenylalanine methyl ester*

775 milligrams (0.001 mol) of L-valyl-L-tyrosyl-L-valyl-L-histidyl-L-prolyl-L-phenylalanine methyl ester (obtained as described in patent application No. 680,904, filed August 29, 1957, by Robert Schwyzer et al.) and 462 milligrams (0.0015 mol) of N-carbobenzyloxy-L-arginine are dissolved or suspended in 5 ml. of freshly distilled dimethyl-formamide, and 0.125 ml. (0.0015 mol) of 12 N-aqueous hydrochloric acid are added. After heating for a short time at 30° C. a clear solution is obtained. It is then cooled to 0° C., 340 milligrams (0.00165 mol) of dicyclohexyl-carbodi-imide are added, and the whole is allowed to stand for 4 hours at 0° C. After a further 10 hours at 20° C., 0.1 ml. of glacial acetic acid is added, the whole is allowed to stand for a further hour, and then the dicyclohexyl-urea formed is filtered off. The filtrate is evaporated under a high vacuum at 40° C., the residue is dissolved in a small amount of water, and the solution is rendered alkaline with sodium carbonate while cooling with ice, and the cheesy precipitate is extracted with n-butanol. After washing the extract neutral and evaporating the solvent, there are obtained 1.28 grams of a crude product which, for the purpose of purification, is subjected to a Craig distribution through 45 stages in the system methanol-water 1:1/chloroform (volume of each phase=10 ml.). From tubes Nos. 17–33 (maximum at No. 24) 660 mg. of a white powder are obtained, which is directly hydrolysed to the free peptide.

*L-arginyl-L-valyl-L-tyrosyl-L-valyl-L-histidyl-L-prolyl-L-phenylalanine*

660 mg. of N-carbobenzyloxy-L-arginyl-L-valyl-L-tyrosyl-L-valyl-L-histidyl-L-prolyl-L-phenylalanine methyl ester are dissolved in 5 ml. of concentrated hydrochloric acid and the whole is heated for 70 minutes at 40° C. By evaporating the solution to dryness at 40° C. in a high vacuum, 360 mg. of a pulverulent hydrochloride are obtained, which, in order to liberate the free peptide is filtered through a weakly basic ion-exchange column (Merck No. II, $\phi=12$ mm., l=13 cm.) with the use of methanol-water 1:1 as solvent. By evaporating the methanol in vacuo and lyophilisation, there are obtained 510 mg. of a colorless powder.

This crude product is subjected to a Craig distribution through 63 stages in the system n-butanol/0.3 m. ammonium acetate solution (pH value=7.0). From the tubes Nos. 17–32 (maximum at No. 24:G=0.62) there is obtained a total of 280 mg. of L-arginyl-L-valyl-L-tyrosyl-L-valyl-L-histidyl-L-prolyl-L-phenylalanine in the form of colorless amorphous powder melting at about 200° C. (with decomposition), after evaporating the solutions to dryness and removing the buffer by sublimation in vacuo. The compound is easily soluble in water and methanol. In the paper chromatogram it exhibits, in the systems tertiary amyl alcohol-triethylamine-veronal-water-isopropanol (100:0.8:1.8:50:40) and secondary butanol-sodium veronal-water-isopropanol (100:0.5:70:15)

unitary spots having $R_f$-values of 0.51 and 0.69 (positive to Pauly reagents and ninhydrin), respectively.

EXAMPLE 2

*N - carbobenzyloxy-nitro-L-arginyl-L-valyl - L - tyrosyl-L-valyl-L-histidyl-L-prolyl-L-phenylalanine-methyl ester*

775 mg. (0.001 mol) of L-valyl-L-tyrosyl-L-valyl-L-histidyl-L-prolyl-L-phenylalanine-methyl ester and 565 mg. (0.00275 mol) of dicyclohexyl-carbodiimide are dissolved in 2 ml. of dimethyl formamide and 10 ml. of acetonitrile, and to the solution are added dropwise 882 mg. (0.0025 mol) of N-carbobenzyloxy-nitro-L-arginine, dissolved in a small quantity of dimethyl formamide. Crystals of dicyclohexyl-urea precipitate soon, and the mixture is allowed to stand at room temperature overnight. After the addition of 0.2 ml. of glacial acetic acid, the whole is allowed to stand for another hour, then filtered and washed with a small amount of methanol. The filtrate is evaporated to dryness in a high vacuum, dissolved in butanol, washed neutral with ice-cold sodium carbonate solution and then with water, and evaporated to dryness. The resulting 1.6 g. of a crude mixture are distributed over 60 stages in the system methanol-water-chloroform-benzene 3:1:3:1. (Volume of each phase=10 ml.) On evaporation to dryness, the contents of tubes Nos. 10–21 yield 900 mg. of material, which is used for hydrogenation.

*L-arginyl-L-valyl-L-tyrosyl-L-valyl-L-histidyl-L-prolyl-L-phenylalanine-methyl ester*

900 mg. of N-carbobenzyloxy-nitro-L-arginyl-L-valyl-L-tyrosyl-L-valyl-L-histidyl - L - prolyl - L - phenylalanine-methyl ester are dissolved in 10 ml. of methanol and 5 ml. of N-hydrochloric acid (in methanol) and, after the addition of 300 mg. of palladium carbon (10%) hydrogenated to completion, the resulting carbon dioxide being absorbed. The uptake of a little more than 5 mols of hydrogen is completed after 6 hours. The catalyst is filtered off, the colorless filtrate evaporated, and the residue dried at 40° C. in a high vacuum until its weight remains constant. There are obtained 890 mg. of a white powder (mixture of heptapeptide-methyl ester-trihydrochloride and ammonium chloride) which can be hydrolized as it is.

*L-arginyl-L-valyl-L-tyrosyl-L-valyl-L-histidyl-L-prolyl-L-phenylalanine*

890 mg. of crude methyl ester are dissolved in 6 ml. of concentrated hydrochloric acid and heated at 40° C. for 1 hour. The solution is then evaporated to dryness in a high vacuum at 40° C. (within about 20 minutes), the residue dissolved in a small quantity of water and filtered through a column charged with a weakly basic ion exchanger (Merck II, in the acetate state; $\phi=12.5$ mm., l.=13 cm.). The aqueous eluate is lyophilized and the resulting 770 mg. of crude product distributed over 100 stages in the system n-butanol-water. (Volume of each phase=10 ml.) From tubes Nos. 6–17 (maximum at No. 11; G=0.13) there is obtained a total of 484 mg. of pure L-arginyl-L-valyl-L-tyrosyl-L-valyl-L-histidyl-L-prolyl-L-phenylalanine-monoacetate.

What is claimed is:

1. An L-α-(lower aminoalkyl)-α-amino-acetyl-L-α-lower alkyl-α-amino-acetyl-L-tyrosyl-L-α-lower alkyl-α-amino-acetyl-L-histidyl-L-prolyl-L-phenylalanine each of said alkyl groups containing 1 to 5 carbon atoms.

2. L - arginyl - L-valyl-L-tyrosyl-L-valyl-L-histidyl-L-prolyl-L-phenylalanine.

3. Acid addition salts of the compounds claimed in claim 1 with therapeutically useful acids.

4. Acid addition salts of the compound claimed in claim 2 with therapeutically useful acids.

References Cited in the file of this patent

Lentz et al.: Jour. of Experimental Medicine, 104, pages 183–191 (1956).

Skeggs et al.: Ibid., pages 193–197.

UNITED STATES PATENT OFFICE
CERTIFICATE OF CORRECTION

Patent No. 3,014,023                               December 19, 1961

Robert Schwyzer et al.

It is hereby certified that error appears in the above numbered patent requiring correction and that the said Letters Patent should read as corrected below.

Column 1, line 71, for "I-ornithyl" read -- L-ornithyl --; column 2, line 1, for "I-valyl" read -- L-valyl --; line 29, for "as" read -- up --; column 3, line 22, for "-carbodi-imide" read -- -carbodiimide --; column 4, line 52, for "%.=13 cm.)." read -- I=13 cm.). --.

Signed and sealed this 7th day of August 1962.

(SEAL)
Attest:

ERNEST W. SWIDER
Attesting Officer

DAVID L. LADD
Commissioner of Patents